US 6,650,826 B1

(12) United States Patent
Hatta

(10) Patent No.: US 6,650,826 B1
(45) Date of Patent: Nov. 18, 2003

(54) EDITING APPARATUS AND METHOD, AND IMAGE MATERIAL SELECTION APPARATUS AND METHOD

(75) Inventor: Masashi Hatta, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/282,698

(22) Filed: Mar. 31, 1999

(30) Foreign Application Priority Data

Apr. 2, 1998 (JP) .......................................... 10-089997

(51) Int. Cl.$^7$ ................................................. H04N 5/93
(52) U.S. Cl. ........................................... 386/52; 386/54
(58) Field of Search .............................. 386/46, 52, 55, 386/54, 95, 125; 345/723; 707/500.1

(56) References Cited

U.S. PATENT DOCUMENTS

| | | | | | |
|---|---|---|---|---|---|
| 5,682,326 A | * | 10/1997 | Klingler et al. | ............. | 345/723 |
| 5,760,767 A | * | 6/1998 | Shore et al. | ............. | 707/500.1 |
| 5,889,514 A | * | 3/1999 | Boezeman et al. | ...... | 707/500.1 |
| 6,154,601 A | * | 11/2000 | Yaegashi et al. | ............... | 386/52 |
| 6,236,802 B1 | * | 5/2001 | Yamamoto | ................... | 386/52 |
| 6,314,231 B1 | * | 11/2001 | Tanaka et al. | ................. | 386/52 |

* cited by examiner

*Primary Examiner*—Huy Nguyen
(74) *Attorney, Agent, or Firm*—Frommer Lawrence & Haug LLP; William S. Frommer; Hans R. Mahr

(57) ABSTRACT

The invention provides an image material selection apparatus and method by which a very high working efficiency in selection operation of an image material can be achieved. The image material selection apparatus includes a display apparatus for displaying identification information of a plurality of image materials on a screen, displaying operation buttons in a corresponding relationship to different pieces of the identification information and displaying, when any of the operation buttons is operated, a motion picture of the corresponding image material on the screen. In the image material selection apparatus, identification information of a plurality of image materials is first displayed on a screen and also a plurality of operation buttons are displayed in a corresponding relationship to different pieces of the identification information. Then, when any of the operation buttons is operated, a motion picture of the corresponding image material is displayed on the screen.

11 Claims, 14 Drawing Sheets

FIG. 4

MATERIAL
Material ID  43A — 43B  44
Version
Title  45
Category  46
File Type  47
Filling Place  48
Filling Date and Start Time  49B / / 49A
  / /  51
50 OK  CANCEL
52 Clear
42

EDITING APPARATUS AND METHOD, AND IMAGE MATERIAL SELECTION APPARATUS AND METHOD

BACKGROUND OF THE INVENTION

1. Field of the Invention

This invention relates to an editing apparatus and method and an image material selection apparatus and method, and more particularly to an editing apparatus and method and an image material selection apparatus and method suitable for use with, for example, an edit list production apparatus.

2. Description of the Related Art

Conventionally, an edit list production apparatus is generally constructed such that an image of an image-sound material designated from among image-sound materials stored in a video server in advance is displayed on a monitor while sound is outputted from a speaker. Thus, an operator can produce an edit list (EDL (Edit Decision List)) which defines edit contents such as in what order and in what manner individual image-sound materials should be linked based on such displayed images and outputted sound.

By the way, in such an edit list production apparatus as described above, for example, by inputting a keyword, a characteristic frame image (hereinafter referred to as representative image) registered in advance which is a corresponding one within a plurality of image-sound materials stored in the video server can be displayed so that the operator can select an image-sound material to be utilized for editing based on the representative image of the image-sound material displayed on the screen.

However, in such an edit list production apparatus as described above, since only a representative image of an image-sound material corresponding to an inputted keyword or the like is displayed on the screen as described above, if a plurality of selected image-sound materials include several image-sound materials whose representative images are similar to each other but whose contents are totally different from each other or in a like case, the contents of the image-sound materials must individually be reproduced and confirmed to select a desired image-sound material. Therefore, the working efficiency is low.

SUMMARY OF THE INVENTION

It is an object of the present invention to provide an editing apparatus and method and an image material selection apparatus and method by which a much higher working efficiency in selection operation of an image material can be achieved.

In order to attain the object described above, according to an aspect of the present invention, there is provided an editing apparatus for editing a plurality of video data or a plurality of audio data, comprising a recording and reproduction apparatus for storing the plurality of video data or the plurality of audio data in an individually corresponding relationship as a plurality of material files and selectively accessing any of the plurality of material files to reproduce the video data or the audio data included in the accessed material file, and a computer including display means for displaying a graphical user interface to be used to edit the plurality of video data or the plurality of audio data on a display unit and control means for controlling a reproduction operation of the recording and reproduction apparatus based on an editing operation in which the graphical user interface is used, the display means displaying a plurality of material cards individually corresponding to the plurality of material files in order to allow contents of the video data or the audio data included in the material files, each of the material cards including an image display section for displaying an image corresponding to the video data or the audio data included in the corresponding material file and a reproduction control section for controlling reproduction of the video data or the audio data related to the image displayed on the image display section, the control means controlling the recording and reproduction apparatus in response to an editing operation in which the reproduction control section is used so as to display a video image corresponding to the editing operation in which the reproduction control section is used.

With the editing apparatus, since a video image of the video data or audio data of any material file can be displayed on a corresponding material card on the display means of the computer by an editing operation, an operator can confirm the contents of the material files and select a desired one of the material files readily in a short time. Consequently, the editing apparatus can significantly augment the working efficiency in selection operation of a material file.

According to another aspect of the present invention, there is provided an editing method for editing a plurality of video data or a plurality of audio data using an editing apparatus which includes a recording and reproduction apparatus for storing the plurality of video data or the plurality of audio data in an individually corresponding relationship as a plurality of material files and selectively accessing any of the plurality of material files to reproduce the video data or the audio data included in the accessed material file, and a computer for displaying a graphical user interface to be used to edit the plurality of video data or the plurality of audio data on a display unit and controlling a reproduction operation of the recording and reproduction apparatus based on an editing operation in which the graphical user interface is used, comprising the steps of displaying a plurality of material cards individually corresponding to the plurality of material files in order to allow contents of the video data or the audio data included in the material files, each of the material cards including an image display section for displaying an image corresponding to the video data or the audio data included in the corresponding material file and a reproduction control section for controlling reproduction of the video data or the audio data related to the image displayed on the image display section, and controlling the recording and reproduction apparatus in response to an editing operation in which the reproduction control section is used so as to display a video image corresponding to the editing operation in which the reproduction control section is used.

With the editing method, since a video image of the video data or audio data of any material file can be displayed on a corresponding material card on the display unit of the computer by an editing operation, an operator can confirm the contents of the material files and select a desired one of the material files readily in a short time. Consequently, the editing method can significantly augment the working efficiency in selection operation of a material file.

According to a further aspect of the present invention, there is provided an image material selection apparatus for selecting any of a plurality of image materials, comprising display means for displaying identification information of the plurality of image materials on a screen, displaying operation buttons in a corresponding relationship to different pieces of the identification information and displaying, when any of the operation buttons is operated, a motion picture of the corresponding image material on the screen.

With the image material selection apparatus, since contents of any image material can be displayed as a motion picture by operating a corresponding operation button displayed on the screen, an operator can confirm the contents of the image materials and select a desired one of the image materials readily in a short time. Consequently, the image material selection apparatus can significantly augment the working efficiency in selection operation of an image material.

According to a still further aspect of the present invention, there is provided an image material selection apparatus for selecting any of a plurality of image materials, comprising a first step of displaying identification information of the plurality of image materials on a screen and displaying a plurality of operation buttons in a corresponding relationship to different pieces of the identification information, and a second step of displaying, when any of the operation buttons is operated, a motion picture of the corresponding image material on the screen.

With the image material selection method, since contents of any image material can be displayed as a motion picture by operating a corresponding operation button displayed on the screen, an operator can confirm the contents of the image materials and select a desired one of the image materials readily in a short time. Consequently, the image material selection method can significantly augment the working efficiency in selection operation of an image material.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a schematic view showing a material retrieval dialog displayed on the display unit shown in FIG. 2;

DETAILED DESCRIPTION OF THE PREFERRED EMBODIMENTS

A preferred embodiment will be described below in detail with reference to the drawings.

1. Construction of the Edit List Production Apparatus

Figure 1:
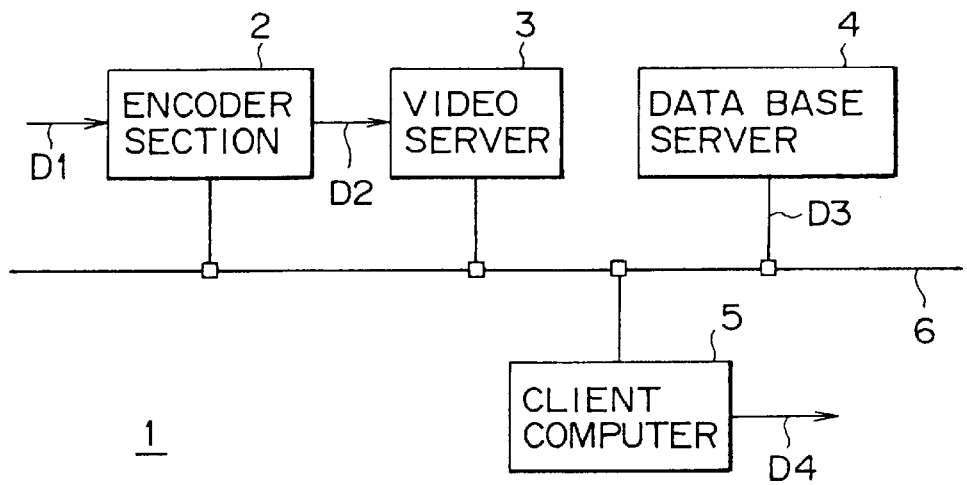
FIG. 1 is a block diagram showing a construction of an edit list production apparatus to which the present invention is applied.

Referring first to FIG. 1, there is shown an edit list production apparatus to which the present invention is applied. The edit list production apparatus shown is generally denoted at 1 and includes an encoder section 2, a video server 3, a data base server 4 and a client computer 5 connected to one another through a local network 6.

The encoder section 2 may be a personal computer including an encoding board, and successively fetches data D1 of various image-sound materials transferred over a telephone line or a transmission line such as a satellite communication line from a data gathering site or reproduced from gathered data tapes reproduced by and supplied from a video tape recorder, compression codes the data D1 based on the standards such as, for example, the MPEG2 (Motion Picture Experts Group Phase 2) standards, and sends out resulting encoded data D2 to the video server 3.

The video server 3 is an AV (Audio Video) server having a recording and reproduction section of a disk array construction, and successively fetches encoded data D2 supplied thereto from the encoder section 2, coverts the encoded data D2 into files individually for different image-sound materials and stores the files into the recording and reproduction section.

In this instance, to the data base server 4 having a recording and reproduction section composed of a hard disk apparatus or the like, data (text data) D3 of text information such as a title, a material ID, a data gathering date, a data gathering place and so forth of each of the image-sound materials inputted by an operator from a text data inputting section, not shown, are supplied over the local network 6. Thus, the data base server 4 produces a data base from the text data D3 of the image-sound materials and stores it into the recording and reproduction section.

The encoded data D2 of the image-sound materials stored in the video server 3 and the corresponding text data D3 stored in the data base server 4 can be read out using the client computer 5.

Actually, the client computer 5 receives, when it is in a material retrieval and selection mode, retrieval terms such as a material ID of an image-sound material desired by an operator as inputs thereto. Then, when a retrieval instruction for the image-sound material is inputted, the client computer 5 retrieves, based on the data base of the text information of the image-sound materials stored in the data base server 4, the corresponding image-sound materials and reads out the text data D3 of the image-sound materials selected by the retrieval.

Further, the client computer 5 causes the video server 3 to read out the encoded data D2 of the corresponding image-sound materials based on the result of the retrieval and to display on the screen based on the encoded data D2 and the text data D3 supplied thereto from the data base server 4, still pictures of the corresponding image-sound materials and part of the text information.

Further, the client computer 5 causes motion pictures to be displayed in place of those still pictures of designated ones of the image-sound materials from among the still pictures of the image-sound materials displayed in such a manner as described above.

As a result, the operator can select a desired image-sound material based on the corresponding still pictures or motion pictures and the text information of the image-sound materials displayed on the screen.

Further, the client computer 5 causes, if, while the client computer 5 is in an editing list production mode following the material retrieval and selection mode, one of the image-sound materials displayed is selected in such a manner as described above and a reproduction instruction is inputted, the video server 3 to read out the encoded data D2 of the image-sound material so that a motion picture is displayed on the screen based on the encoded data D2.

As a result, the operator can designate an in point and an out point while observing the motion picture thus displayed on the screen to register a desired portion of the image-sound material as a clip, and can successively register desired portions of a plurality of image-sound materials as clips by a similar method.

Further, the operator can produce an edit list, which defines editing contents such as in what manner the clips registered in this way are to be linked, using the client computer 5. Data D4 (hereinafter referred to as edit list data) of the editing list produced in this manner are supplied from the client computer 5 to an editing processing system, and actual editing processing is executed based on the edit list data D4 by the editing processing system.

2. Construction of the Client Computer

Figure 2:
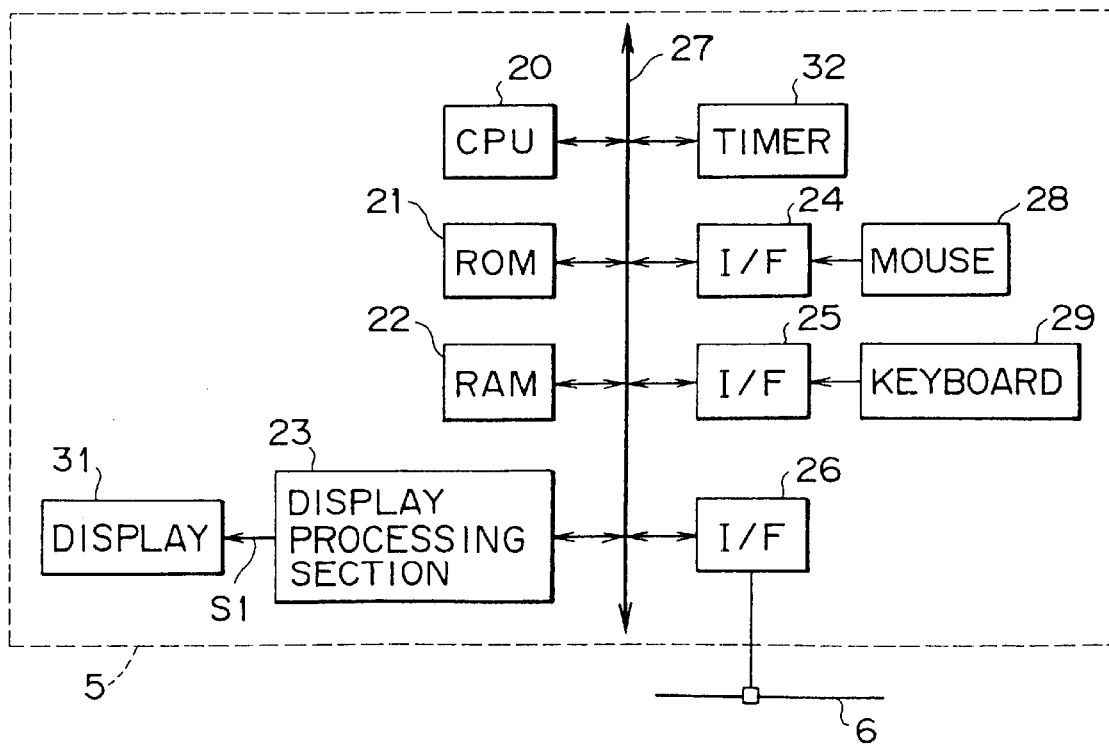
FIG. 2 is a block diagram showing a construction of a client computer of the edit list production apparatus of FIG. 1.

Referring now to FIG. 2, the client computer 5 includes a central processing unit (CPU) 20, a read only memory (ROM) 21, a random access memory (RAM) 22, a display processing section 23, a timer 32 and a plurality of interface circuits 24 to 26 all interconnected by a CPU bus 27. A mouse 28 and a keyboard 29 are connected to the first and second interface circuits 24 and 25, respectively, and the local network 6 is connected to the third interface circuit 26.

The CPU 20 reads out, when it operates, image data stored in the ROM 21 in accordance with the necessity based on a program stored in the ROM 21 and supplies the image data as an image signal S1 to a display unit 31 through the display processing section 23 so that any of such various GUI (Graphical User Interface) screens as hereinafter described, a cursor which moves on the screen in response to an operation of the mouse 28 and numerals and/or characters inputted through the keyboard 29 are displayed on the display unit 31.

Further, if an instruction to execute predetermined processing is received through the first interface circuit 24 or second interface circuit 25 as the mouse 28 or the keyboard 29 is operated, then the CPU 20 accesses the video server 3 or the data base server 4 successively through the third interface circuit 26 and the local network 6 in accordance with the necessity based on a program stored in the ROM 21 to reproduce the encoded data D2 or the text data D3 of a required image-sound material.

Furthermore, the CPU 20 fetches the encoded data D2 or the text data D3 of the image-sound material reproduced by the video server 3 or the data base server 4 in this manner successively through the local network 6 and the third interface circuit 26 and causes the display processing section 23 to decode the encoded data D2 or the text data D3 in accordance with the necessity. Then, the CPU 20 supplies an image signal S1 obtained by the decoding processing to the display unit 31 so that a still picture or a motion picture of the corresponding image-sound material is displayed at a corresponding position on a GUI screen.

3. Operation Procedures on Various GUI Screens

Figure 3:
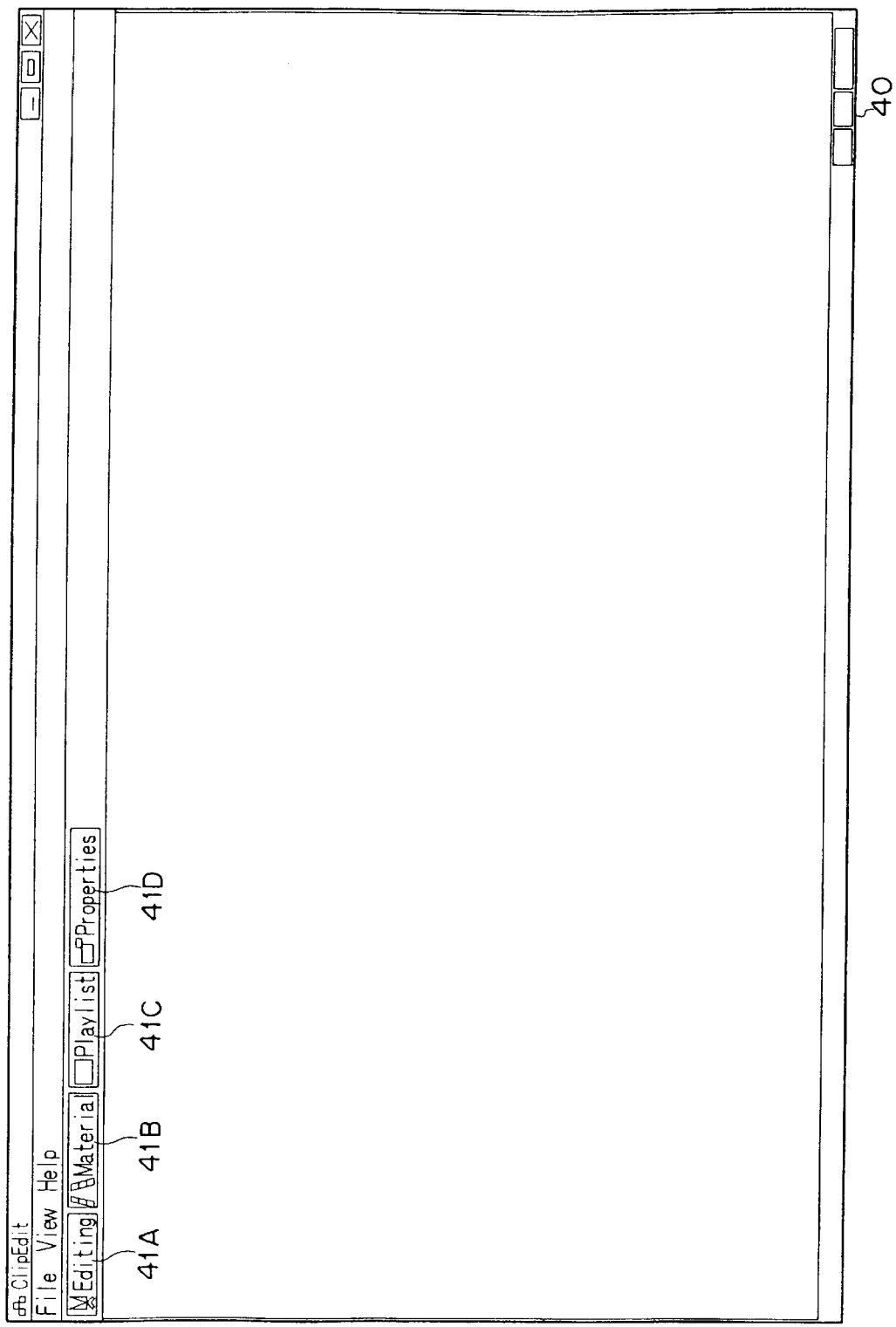
FIG. 3 is a schematic view showing an initial screen of a display unit of the client computer of FIG. 2.

Here, the CPU 20 causes such an initial screen 40 as shown in FIG. 3 to be displayed on the display unit 31 upon starting when power supply is made available. Then on the initial screen 40, the material retrieval and selection mode can be selected by clicking a material retrieval button 41B from among a plurality of buttons 41A to 41D provided at an upper stage of the initial screen 40, and as a result, such a material retrieval dialog 42 as shown in FIG. 4 is displayed in an overlapping relationship on the initial screen 40.

Then, in this state, the operator can designate an image-sound material to be retrieved by inputting all or some of the material ID of a desired image-sound material, a version number of a desired version when the image-sound material has been modified several times, the title, a category such as sports or news to which the image-sound material belongs, a file type of the image-sound material such as whether it includes only images or sound, a data gathering place, and dates and times when data gathering is started and ended. Incidentally, the operator can designate a plurality of image-sound materials as an object of retrieval by designating a staring material ID to an ending material ID for retrieval.

The material ID, version, title, category, file type, data gathering place and data gathering start and end dates and times inputted in such a manner as described are displayed in material ID display sections 43A and 43B of the material retrieval dialog 42, a version display section 44, a title display section 45, a category display section 46, a file type display section 47, a filing place display section 48, and a data gathering start time display section 49A and a data gathering end time display section 49B, respectively.

Then, after the retrieval terms such as the retrieval ID of the image-sound material to be retrieved are inputted in such a manner as described above, the operator can click an OK button 50 to start retrieval of the corresponding image-sound material.

Further, the operator can click a cancel button 51 to close the material retrieval dialog 42 without execution of retrieval, or can click a clear button 52 to erase all of the information displayed respectively in the material ID display sections 43A and 43B, version display section 44, title display section 45, category display section 46, file type display section 47, filing place display section 48, and data gathering start time display section 49A and data gathering end time display section 49B.

Figure 5:
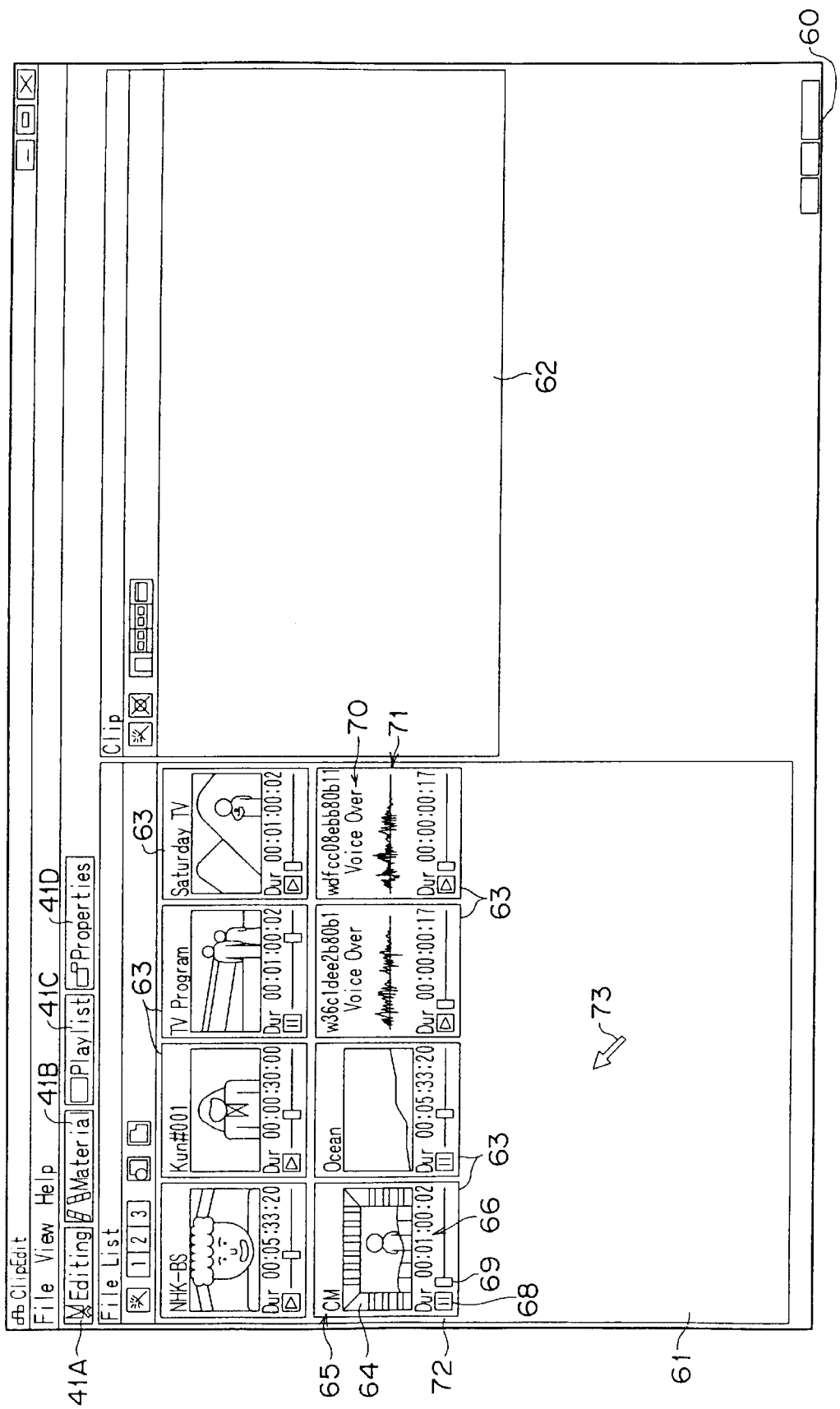
FIG. 5 is a schematic view showing a material selection screen of the display unit shown in FIG. 2.

Then, if the OK button 50 is clicked after the retrieval terms such as the material ID of the image-sound material to be retrieved are inputted, then based on the thus inputted retrieval terms and the data base of the text information of the image-sound materials stored in the data base server 4 (FIG. 1), corresponding image-sound materials are retrieved, and such a material selection screen 60 as shown in FIG. 5 is displayed on the display unit 31.

In this instance, a file list window 61 and a clip window 62 are provided on the material selection screen 60, and such material cards 63 as shown in FIG. 5 are displayed in the file list window 61 in a corresponding relationship to image-sound materials selected based on preceding retrieval processing performed in advance.

In this instance, on each of the material cards 63, a still picture of the top frame of a corresponding image-sound material is displayed on an image display section 64, and a title 65 of the image-sound material is displayed on the upper side of the image display section 64. Further, on the lower side of the image display section 64 of the material card 63, a material length (duration) 66 of the image-sound material is displayed, and on the lowermost stage of the material card 63, an operation button 68 to which a bit map 67 of a reproduction mark is applied and a slider 69 are displayed.

Further, on each of the material cards 63, as shown in FIG. 5, for a material which only includes sound which can be utilized such as background music with no image, a character set 70 of "Voice Over" and a waveform mark 71 which looks like an envelope waveform of a sound signal are displayed in place of the image display section 64.

Then, the operator can click the operation button 68 in any of the desired material cards 63 displayed in the file list window 61 to display a motion picture of the corresponding image-sound material in the image display section 64 of the material card 63 and output, if the material only includes sound, the sound from a speaker not shown. It is to be noted that such reproduction of a motion picture of a corresponding image-sound material can be performed for a plurality of image-sound materials.

In this instance, on the material card 63, the display of the bit map 67 on the operation button 68 is changed to a display of a stop mark, and the slider 69 is slidably moved toward the right of the screen so that it may be positioned at a corresponding position within the range of movement in response to a reproduction situation of the image-sound material. Incidentally, when a stop mark is displayed as the bit map 67 on the operation button 68, the operation button 68 can be clicked to stop reproduction of the motion picture displayed on the image display section 64 of the material cards 63 and display a still picture instead.

Further, the operator can cause, by moving a cursor 73 onto the slider 69 on the desired material card 63 displayed in the file list window 61 and then pressing (dragging) the button of the mouse 28 and then moving, in this state, the cursor 73 in a horizontal direction to slidably move the slider 69, a frame image corresponding to the position of the corresponding slider 69 to be successively displayed in the image display section 64 of the material card 63.

Then, on the material selection screen 60, after confirmation of the contents of the image-sound materials by such operations as described above, a desired image-sound material can be selected by adjusting the cursor 73 to the material card 63 of the image-sound material, pressing the button of the mouse 28, moving, in this state, the cursor 73 to a desired position in the clip window 62 and releasing the mouse 28 (drag and drop).

Figure 7:
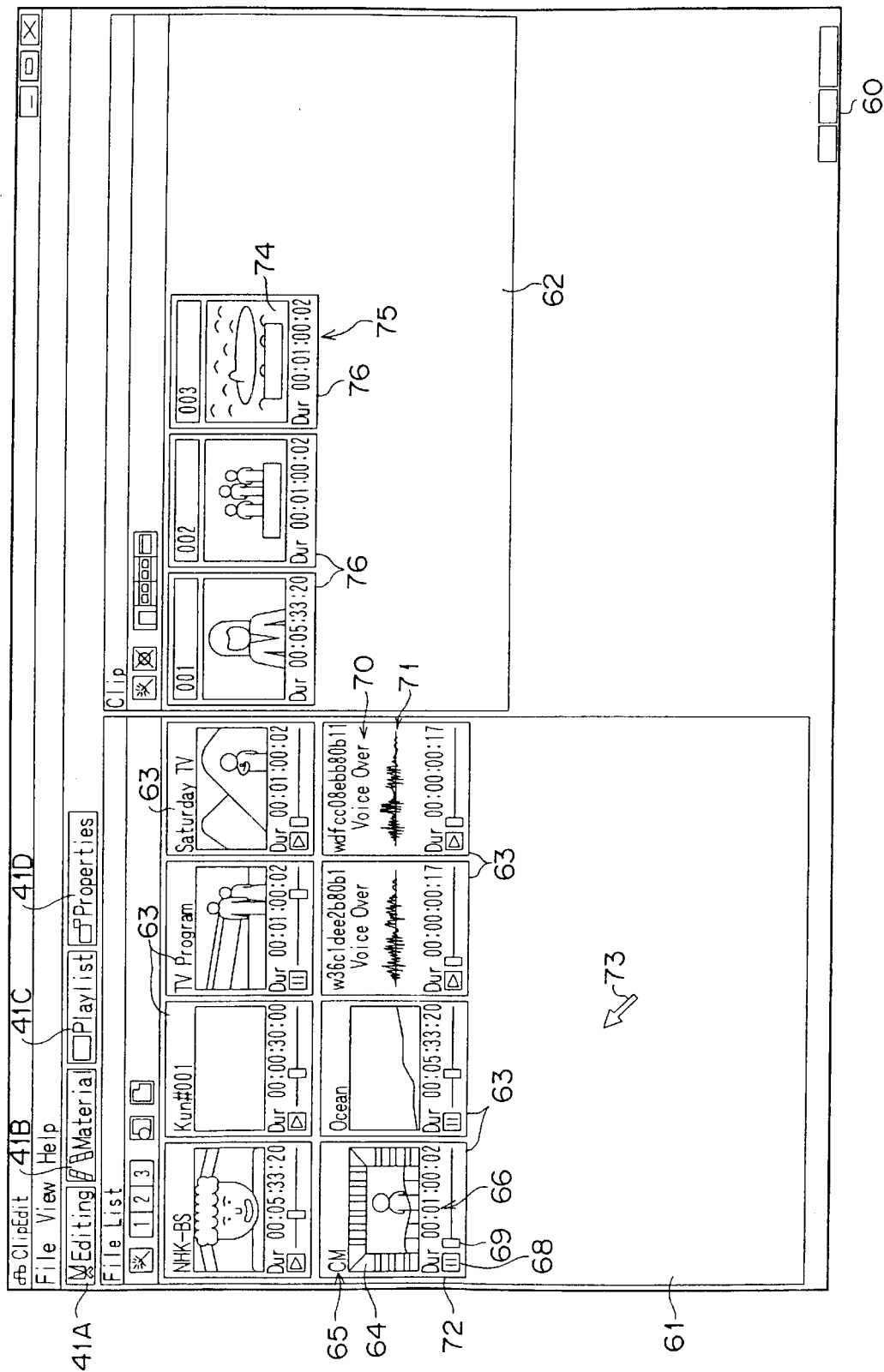
FIG. 7 is a schematic view showing another material selection screen of the display unit shown in FIG. 2.

In this instance, as shown in FIG. 7, in a corresponding relationship to the selected image-sound material, a clip card 76 wherein a frame image of the top image of the image-sound material is displayed in an image display section 74 and a material length 75 of the image-sound material is displayed below the image display section 74 is displayed. Further, where the selected material only includes sound, a clip card 76 wherein a 70 of "Voice Over", a waveform mark 71 having an envelope waveform of a sound signal and a material length 75 are displayed is displayed.

Thus, the operator can successively select desired image-sound materials from among the individual image-sound materials whose material cards 63 are displayed in the file list window 61 by such operations as described above.

Figure 8:
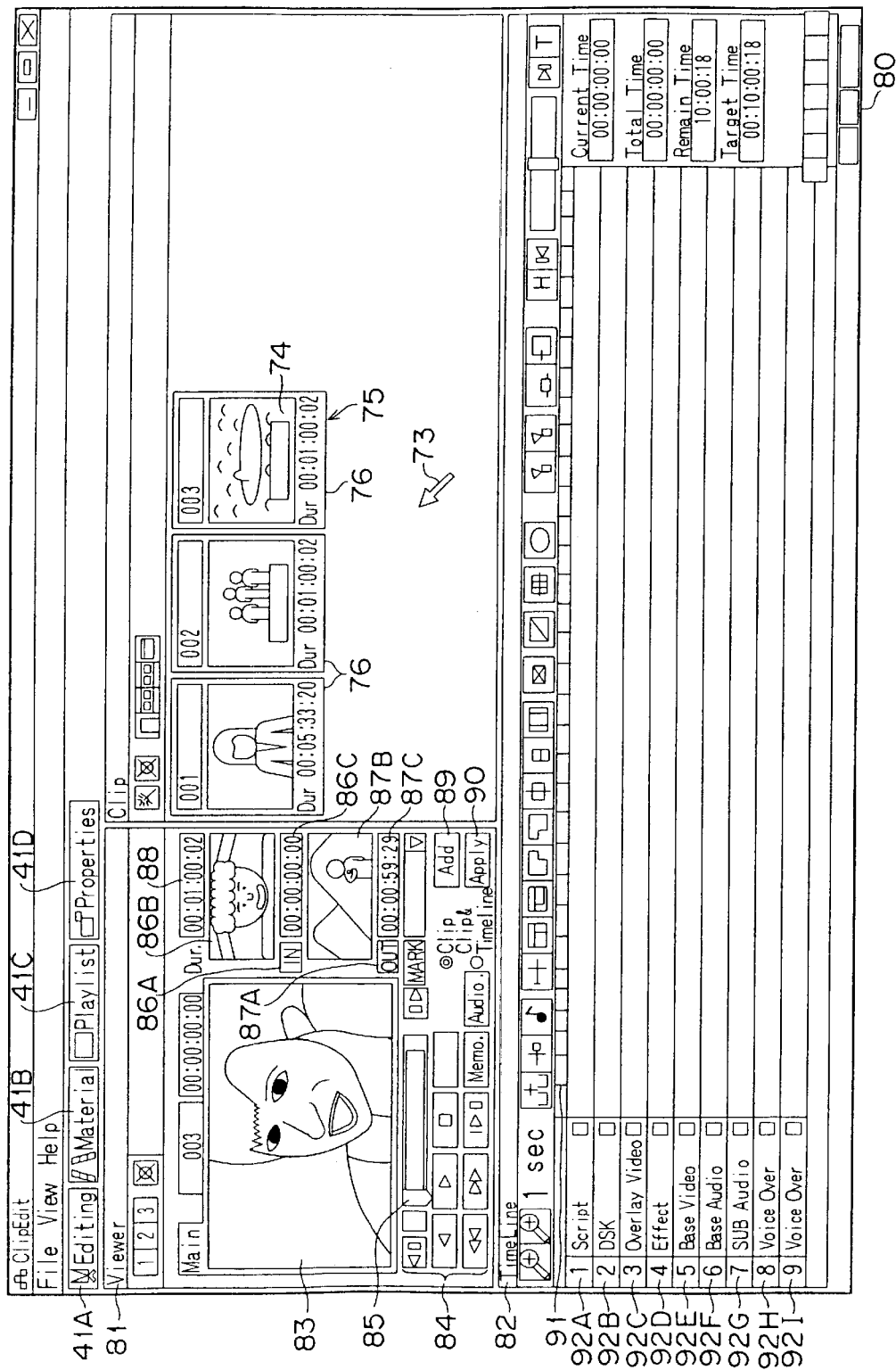
FIG. 8 is a schematic view showing a construction of an edit list production screen of the display unit shown in FIG. 2.

Further, after all desired image-sound materials are selected, the operator can select the edit list production mode by double clicking one of the clip cards 76 displayed in the clip window 62. In this instance, such an edit list production screen 80 as shown in FIG. 8 is displayed on the display unit 31 (FIG. 3).

The edit list production screen 80 includes the clip window 62 described above, a viewer window 81 displayed in place of the file list window 61 (FIG. 5), and a time line window 82.

In the viewer window 81, a frame image at the top of the image-sound material corresponding to the clip card 76 double clicked in such a manner as described above is displayed in an image display section 83.

Further, in the viewer window 81, by double clicking the clip card 76 corresponding to a desired image-sound material from among the clip cards 76 displayed in the clip window 62, the top frame image of the corresponding image-sound material can be displayed in the image display section 83. It is to be noted that, where the double clicked material only includes sound, the character set "Voice Over" and a waveform mark representing an envelope waveform of a sound signal are displayed in the image display section 83.

Further, in the viewer window 81, by clicking one of operation buttons 84 displayed below the image display section 83 or dragging and operating a cursor 85, an operation such as reverse reproduction, normal reproduction, stopping, reverse double speed reproduction, double speed reproduction or time-lapse reproduction can be performed in response to the operation button 84 for the image-sound material whose top frame image is displayed in the image display section 83. In this instance, a reproduced motion picture is displayed in the image display section 83, but in the case where the material only includes sound, sound is outputted from the speaker.

Thus, the operator can observe the motion picture displayed on the image display section 83 of the viewer window 81 or listen to the sound outputted from the speaker and click an in point button 86A and an out point button 87A to designate a start point (in point) and a last point (out point) of a desired portion of the image-sound material in such a manner as described above. A frame image and a time code at the in point designated then are displayed in an in point image display section 86B and an in point time code display section 86C while a frame image and a time code at the out point are displayed on an out point image display section 87B and an out point time code display section 87C, respectively. Further, the length from the in point to the out point (that is, the length of the clip) is displayed on a duration display section 88.

After the in point and the out point are designated in this manner, the operator can register the portion of the image-sound material from the in point to the out point as a clip separately from the original image-sound material by clicking an add button 89. A frame image (hereinafter referred to as in point image) at the in point of the click registered at this time is displayed in the image display section 74 of another clip card 76 displayed newly separately from the clip card 76 corresponding to the original image-sound material in the clip window 62.

Further, after the in point and the out point are designated in such a manner as described above, the operator can register the portion of the image-sound material from the in point to the out point as a clip in place of the original image-sound material by clicking an apply button 90. An in point image of the clip registered then is displayed on the image display section 74 of the clip card 76 corresponding to the original image-sound material in the clip window 62.

Meanwhile, on the edit list production screen 80, after a plurality of clips are registered in such a manner as described above, an edit list can be produced in accordance with the following method using the time line window 82.

In this case, the cursor 73 is first moved to the clip card 76 of a desired clip in the clip window 62 and the button of the mouse 28 is pressed, and then, in this state, the cursor 73 is moved, using a time scale 91 in the time line window 82 as an index, to a desired position on a video track 92E (where the clip only includes sound, a voice over track 92H or 92I) of a plurality of tracks 92A to 92I provided along the time scale 91, whereafter the button of the mouse 28 is released (drag and drop).

Figure 9:
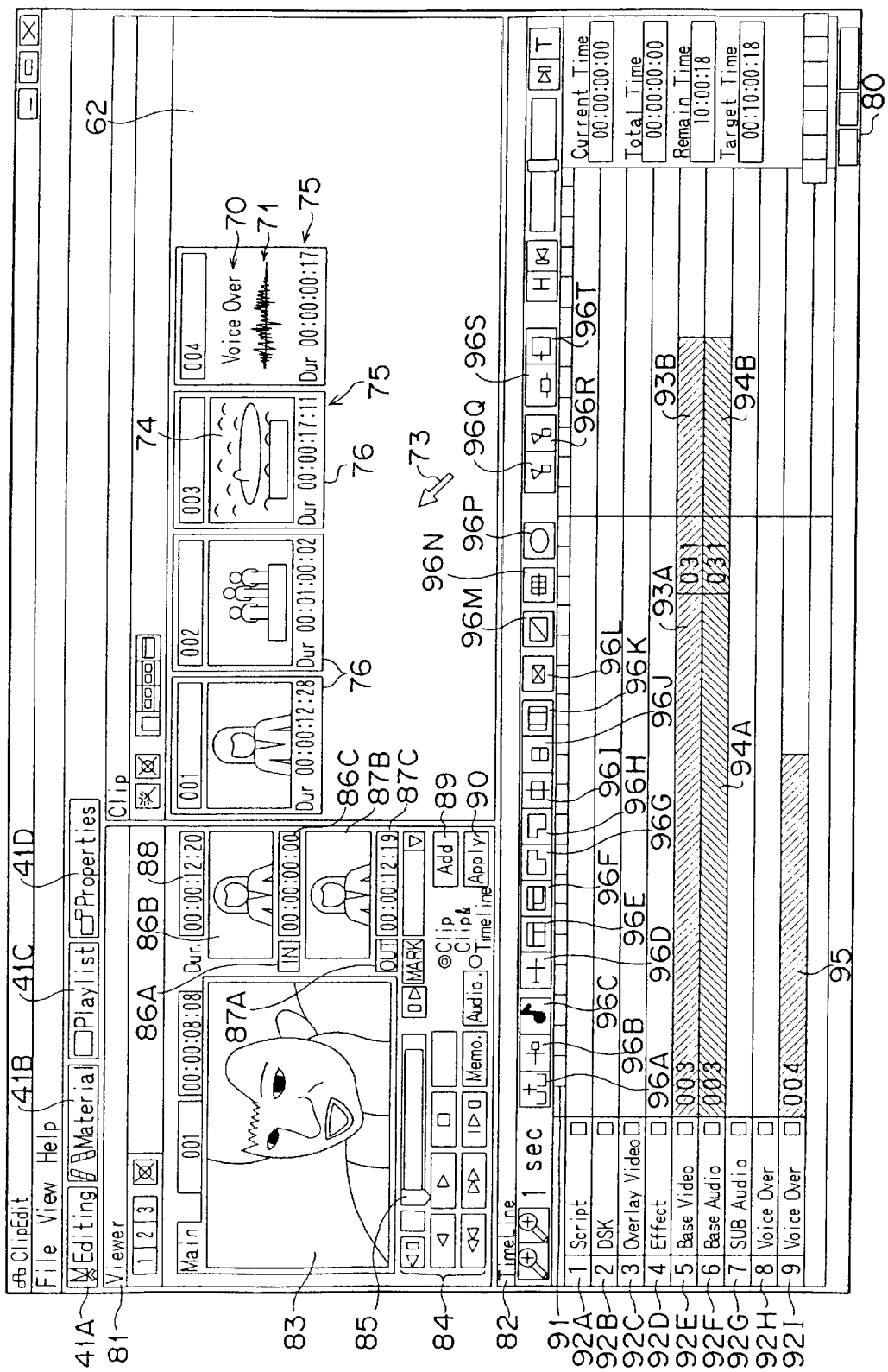
FIG. 9 is a schematic view showing a construction of another edit list production screen of the display unit shown in FIG. 2.
Figure 10:
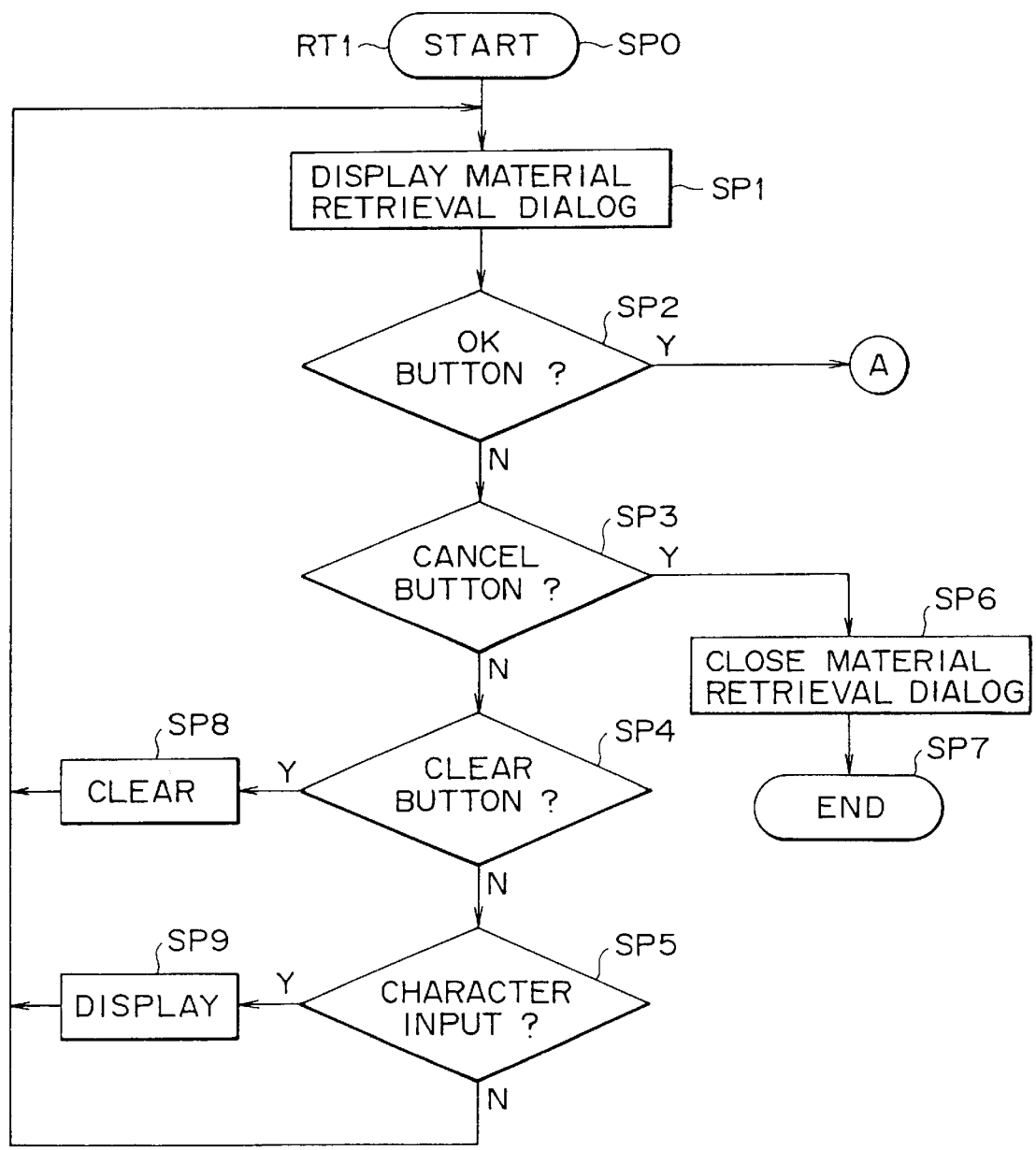
FIGS. 10 to 15 are flow charts illustrating a material retrieval and selection mode processing procedure of the edit list production apparatus of FIG. 1.
Figure 11:
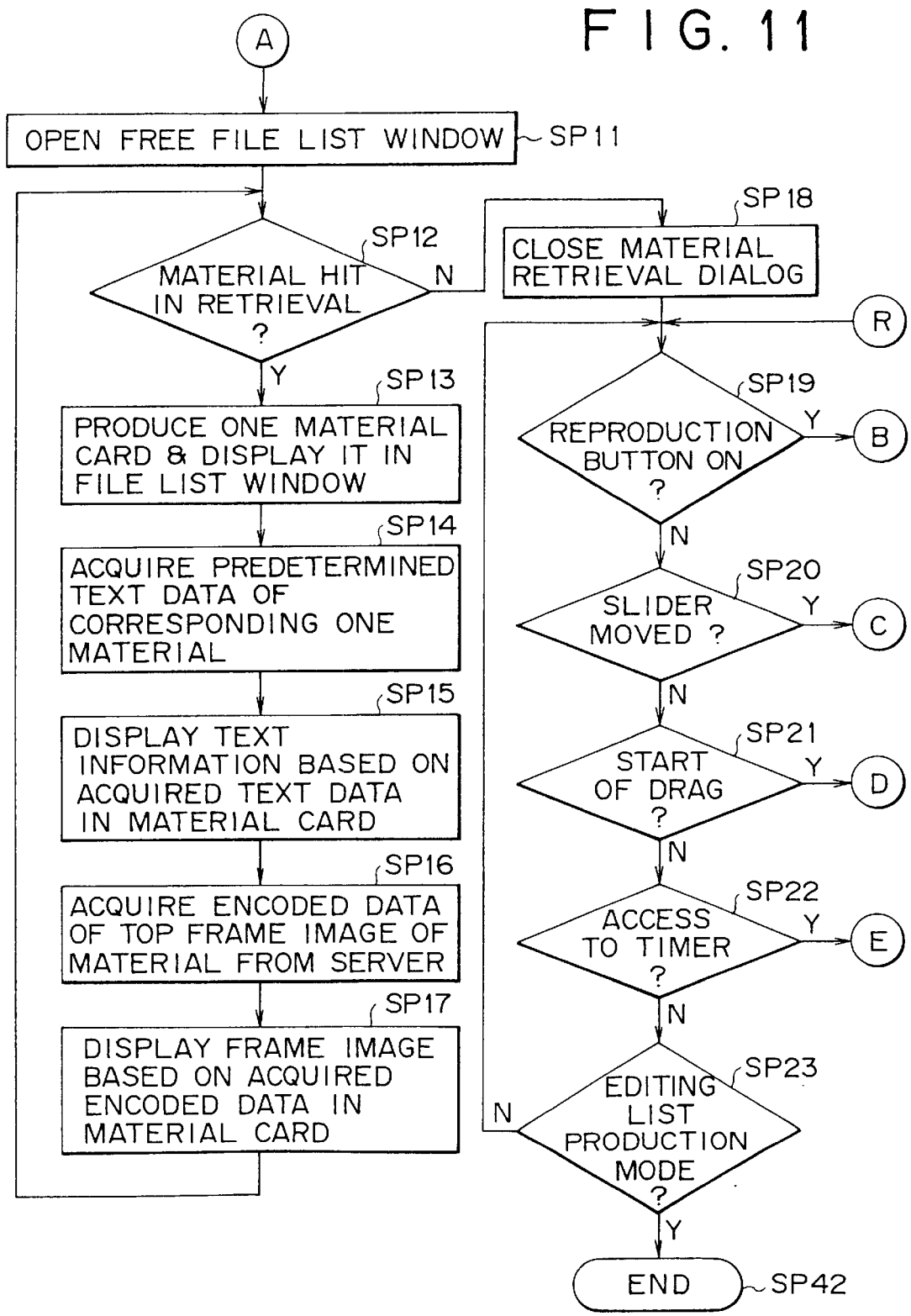
Figure 12:
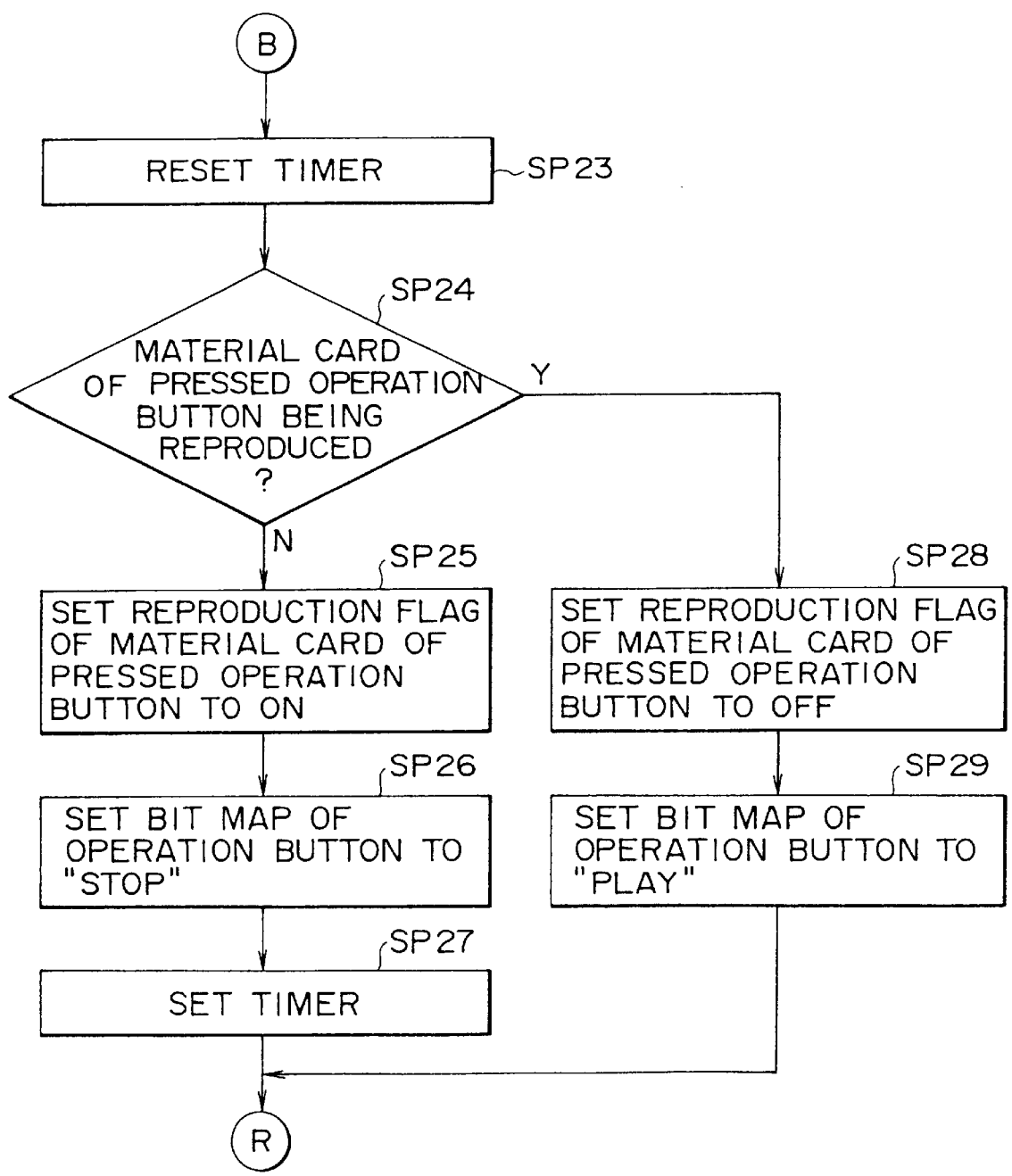
Figure 13:
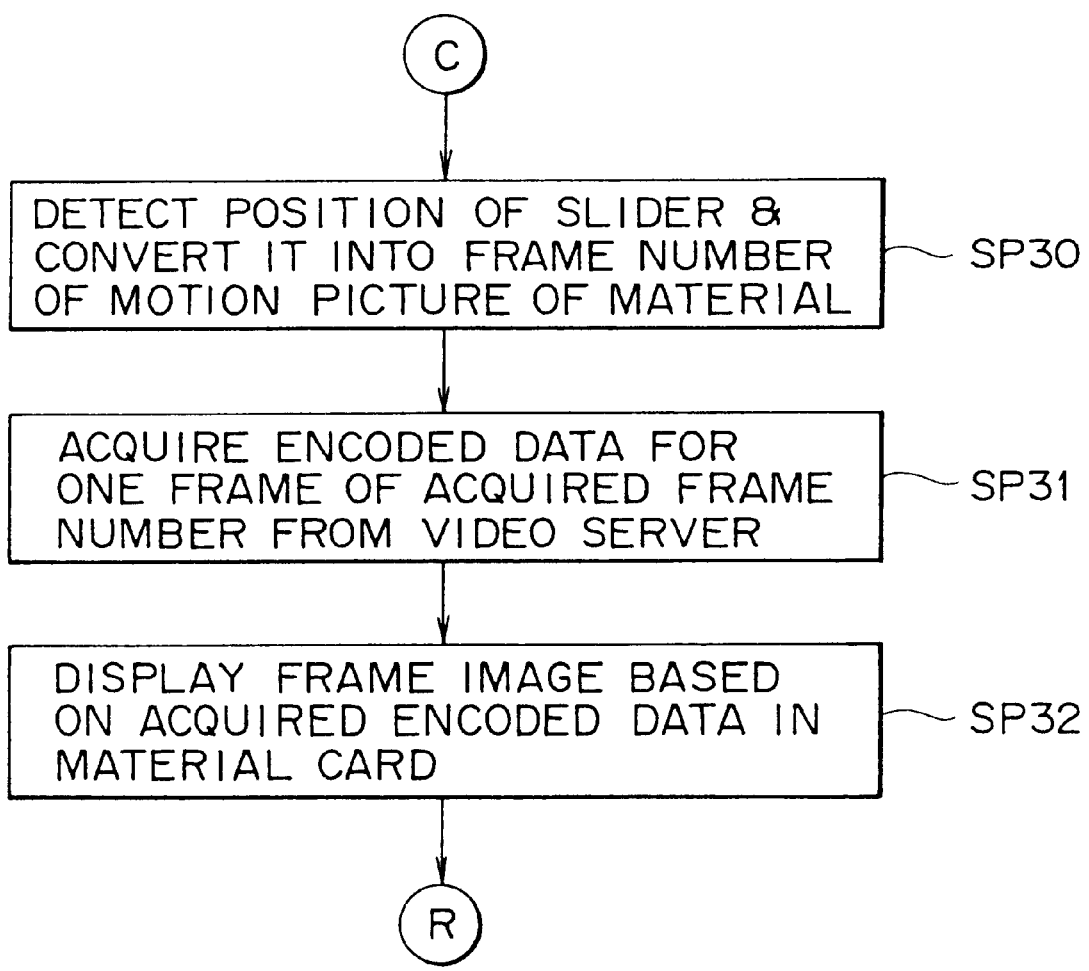
Figure 14:
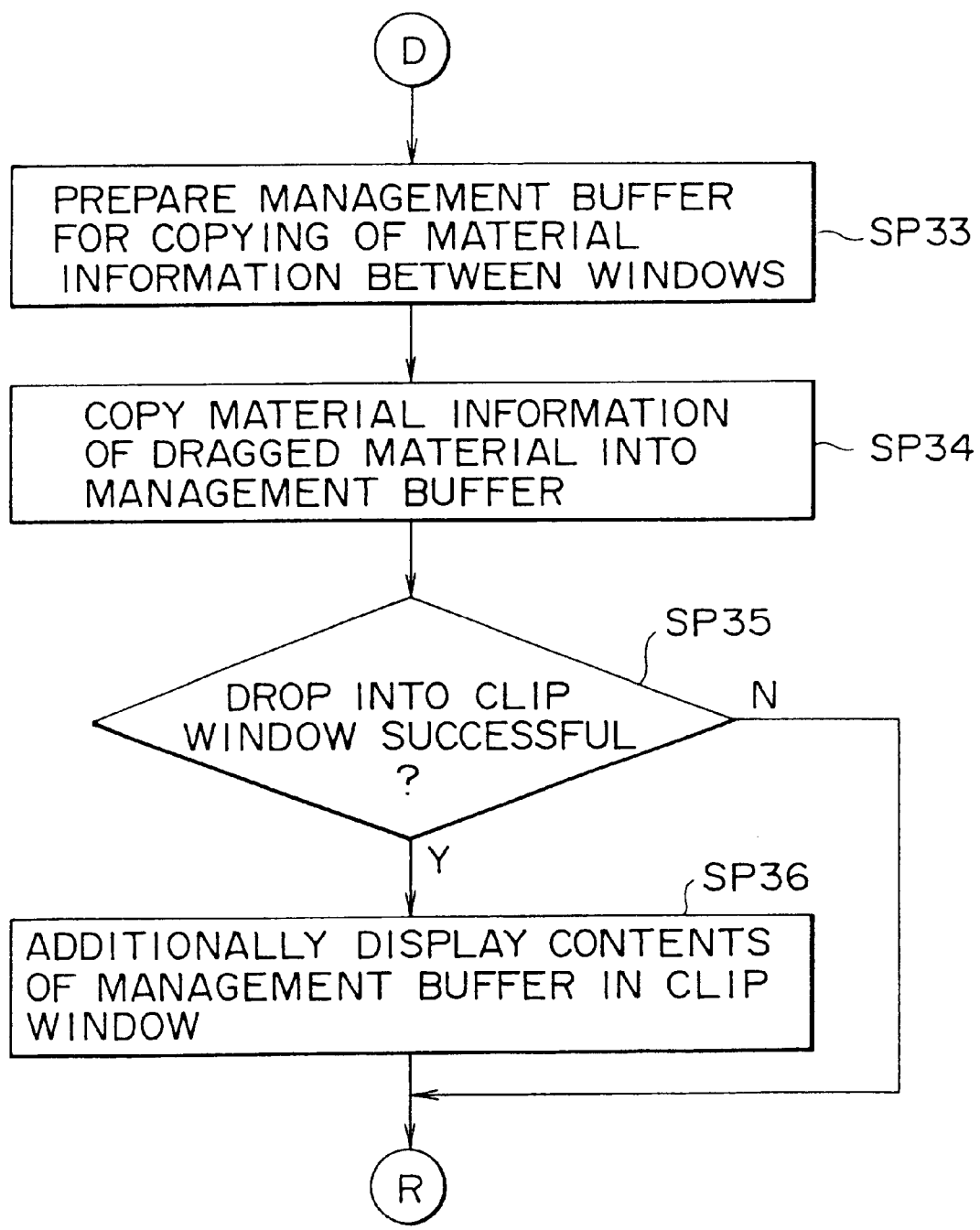
Figure 15:
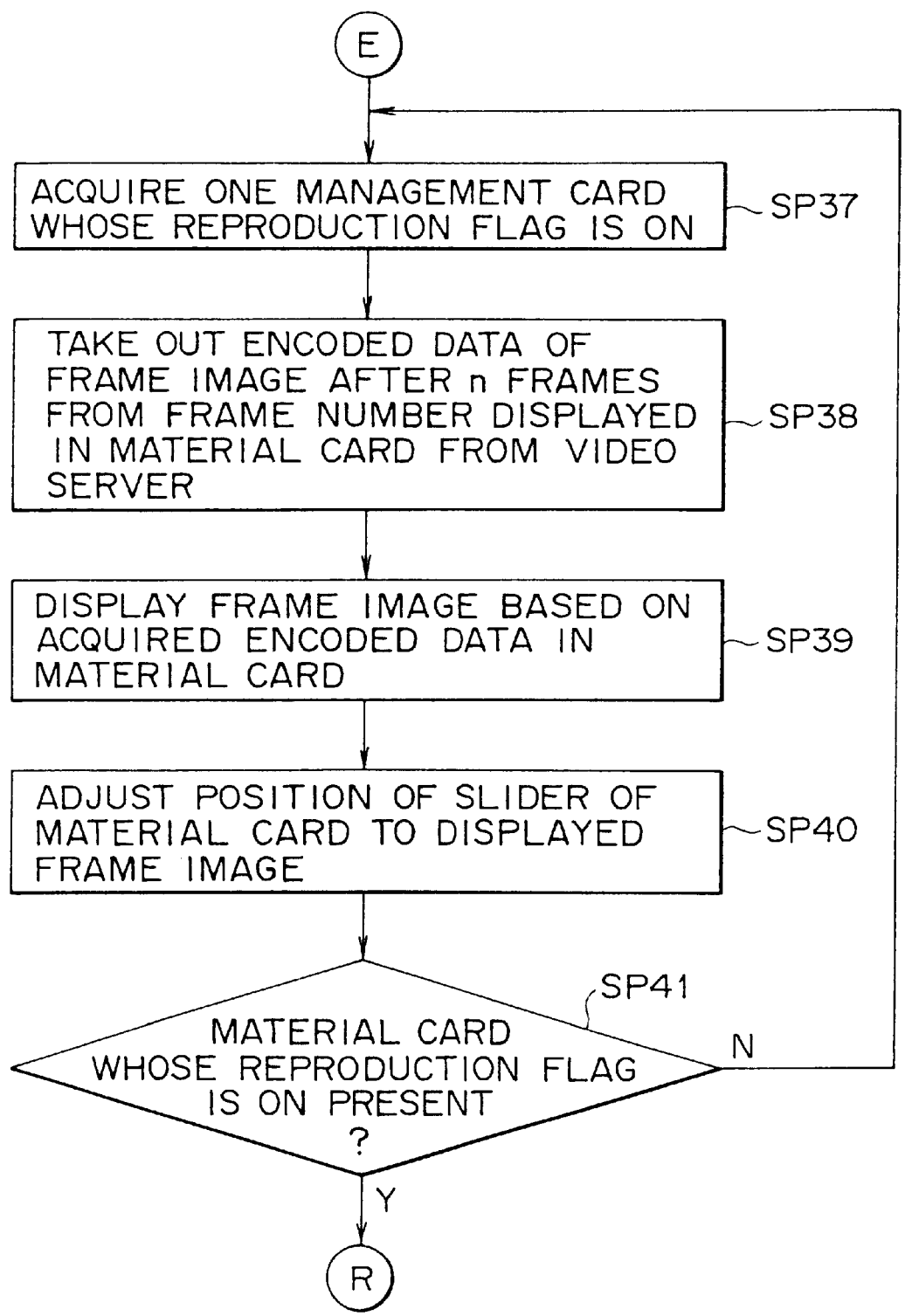

As a result, in the time line window 82, bars 93A and 93B (or a bar 95) of a predetermined color extending from the position of the cursor 73 then and having a length corresponding to the material length of the clip corresponding to the drag-and-dropped clip card 76 are displayed in the video track 92E (or voice over tracks 92H and 92I) as shown in FIG. 9. Further, if the clip includes sound, then bars 94A and 94B of a length equal to that of the bars 93A and 93B displayed on the video track 92E are displayed at the same position on the time scale 91 on the audio track 92F.

Then, the operator repetitively performs such operations as described above so that the video track 94A and the audio track 92F are displayed continuously on the time scale 91 from the first time code ("00.00.00:00") to a desired time code (that is, for a desired time period) of the time scale 91 and, when necessary, the bars 93A, 93B 94A, 94B and 95 are displayed successively on the voice over tracks 92H and 92I, respectively.

Here, that the bars 93A, 93B, 94A, 94B and 95 are displayed on the video track 92E, the audio track 92F and the voice over tracks 92H and 92I of the time line window 82 in this manner signifies that, when an edited image or sound is to be outputted, an image is displayed or sound is outputted of a clip corresponding to the bars 93A, 93B, 94A, 94B and 95 within a time represented by the time scale 91. Therefore an edit list which successively defines the clip image displayed as edited image or clip sound outputted as edited sound, can be produced by the operations mentioned above.

It is to be noted that, when an edit list is produced in this manner, for example, if it is desired to apply a special effect process at a changeover point from an image of a first clip to an image of a second clip, a special effect selection button 96H is clicked from among a plurality of buttons 96A to 96T provided in an upper stage of the time line window 82 for selecting various processes.

As a result, a predetermined dialog (not shown) in which a plurality of icons (hereinafter referred to as effect icons) representative of contents of those special effect processes which can be executed are displayed is displayed in an overlapping relationship on the edit list production screen 80.

Then, the operator will perform a drag-and-drop operation so that the icon corresponding to the desired special effect process in the dialog may be displayed in a state pasted on the effect track 92D at a same position on the time scale 91 as the boundary between the bars 93A and 93B corresponding to the first and second clips, respectively, displayed on the video track 92E of the time line window 82.

By the operation described, an instruction to execute a special effect process corresponding to the effect icon posted in such a manner as described above at the join of images of the first and second clips can be inputted.

In this manner, with the edit list production apparatus 1, it is possible, using the client computer 5, to select a desired image-sound material from among a plurality of image-sound materials stored in the video server 3, to designate an in point and an out point of the image-sound material and to produce a clip and produce an edit list based on such clips.

4. Processing Procedure of the CPU in the Material Retrieval and Selection Mode

The CPU 20 of the client computer 5 actually executes, in the material retrieval and selection mode, such various processes as described above in accordance with a material retrieval and selection mode processing procedure RT1 illustrated in FIGS. 10 to 15.

In particular, if the material retrieval button 41B is clicked in a condition wherein the initial screen 40 (FIG. 3) is displayed on the display unit 31 (FIG. 2), then the CPU 20 starts the material retrieval and selection mode processing procedure RT1 at step SP0, and displays the material retrieval dialog 42 (FIG. 4) on the initial screen 40 in next step SP1.

Then, the CPU 20 advances its control to step SP2 so that it successively discriminates in steps SP2, SP3, SP4 and SP5 whether or not the OK button 50 is clicked, whether or not the cancel button 51 is clicked, whether or not the clear button 52 is clicked and whether or not a character, a numeral or the like is inputted using the keyboard 29 (FIG. 2), respectively.

If, for example, the discrimination in step SP3 is in the affirmative, then the CPU 20 advances its control to step SP6, in which it closes the material retrieval dialog 42, and then to step SP7, in which the CPU 20 ends the material retrieval and selection mode processing procedure RT1.

On the other hand, if the discrimination in step SP4 is in the affirmative, then the CPU 20 advances its control to step SP8, in which the CPU 20 erases all information displayed in the material ID display sections 43A and 43B, the version display section 44, the title display section 45, the category display section 46, the file type display section 47, the filing place display section 48, and the data gathering start time display section 49A and the data gathering end time display section 49B of the material retrieval dialog 42. Thereafter, the CPU 20 returns its control to step SP1.

Further, if the discrimination in step SP5 is in the affirmative, then the CPU 20 advances its control to step SP9, in which it causes the character, numeral or the like inputted using the keyboard 29 (FIG. 2) to be displayed at a corresponding position in the material retrieval dialog 42.

On the other hand, if the discrimination in step SP2 is in the affirmative, then the CPU 20 advances its control to step SP11 (FIG. 11), in which it opens a file list window 61 and a clip window 62, which are empty, on the initial screen 40 to display such a material selection screen 60 as shown in FIG. 5 (it is to be noted that, in this instance, the material retrieval dialog 42 is open), and then to step SP12, in which it discriminates whether or not a corresponding image-sound material has been detected successfully.

Figure 6:
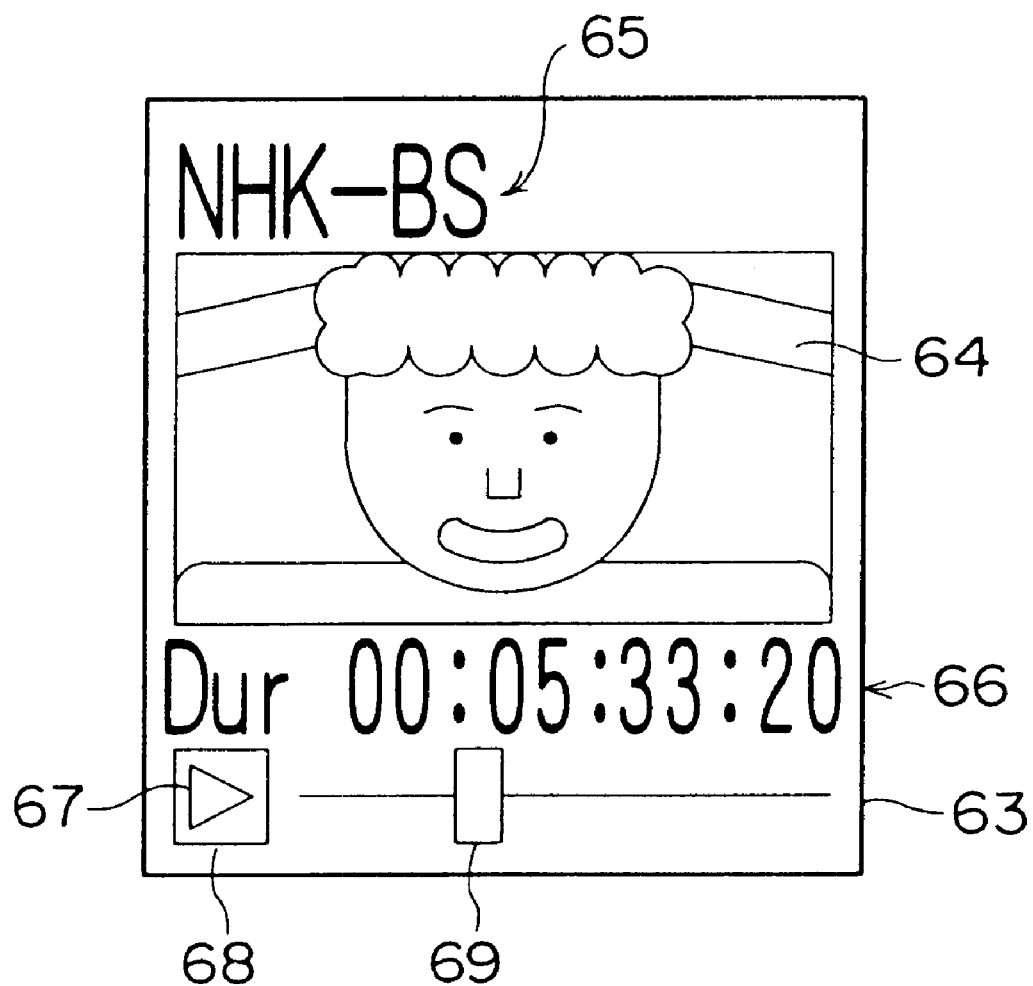
FIG. 6 is a schematic view showing a construction of a material card shown on the material selection screen of FIG. 5.

If the discrimination in step SP12 is in the affirmative, then the CPU 20 advances its control to step SP13, in which a material card 63 (FIG. 6) for displaying an image of the image-sound material is displayed in the file list window 61, and then to step SP14, in which the CPU 20 reads out text data D3 regarding the title and the material length of the image-sound material from the data base server 4 (FIG. 1). Then, the CPU 20 advances its control to step SP15, in which the title and the material length based on the text data D3 are displayed at corresponding positions in the material card 63 displayed in step SP13.

Then, the CPU 20 advances its control to step SP16, in which it reads out encoded data D2 of a top frame image of the image-sound material from the video server 3 (FIG. 1), and then to step SP17, in which the frame image based on the encoded data D2 is displayed in the image display section 64 (FIG. 6) of the material card 63 displayed in step SP13, whereafter the CPU 20 returns its control to step SP12.

Then, the CPU 20 repetitively executes the processing of the loop of steps SP12-SP13-SP14-SP15-SP16-SP17-SP18 until an affirmative discrimination is obtained in step SP12. Then, if the retrieval is completed and an affirmative discrimination result is obtained in step SP12, then the control advances to step SP18, in which the CPU 20 closes the material retrieval dialog 42, whereafter the control advances to step SP19.

Then, the CPU 20 successively and repetitively discriminates in steps SP19, SP20, SP21, SP22 and SP23 whether or not the operation button 68 of any of the material cards 63 displayed in the file list window 61 is clicked, whether or not the slider 69 of any of the material cards 63 is operated, whether or not any of the material cards 63 is dragged, whether or not the timer 32 is called and whether or not, for example, the edit list production mode is selected by double clicking of any of the clip cards 76 displayed in the clip window 62.

Then, for example, if the discrimination in step SP19 is in the affirmative, then the CPU 20 advances its control to step SP23 (FIG. 12), in which it resets the timer 32, and then to step SP24, in which the CPU 20 discriminates whether or not the material card 63 whose operation button 68 has been clicked is proceeding with reproduction of a motion picture or sound of the corresponding image-sound material.

If the discrimination in step SP24 is in the negative, then the CPU 20 advances its control to step SP25, in which a reproduction flag of the material card 63 whose operation button 68 has been clicked is changed to on, and then to step SP26, in which the bit map 67 to be displayed on the operation button 68 is set to a stop mark. Then, the CPU 20 advances its control to step SP27, in which the timer 32 is set to a frame period of the motion picture displayed on the material card 63, whereafter the CPU 20 returns its control to step SP19 so that it thereafter repeats the processing of the loop of the steps SP19-SP20-SP21-SP22-SP23-SP19 until an affirmative discrimination is obtained in any of the steps SP19 to SP23.

On the contrary, if the discrimination in step SP24 is in the affirmative, then the CPU 20 advances its control to step SP28, in which the reproduction flag for the material card 63 whose operation button 68 has been clicked is changed to off, and then to step SP29, in which the bit map 67 to be displayed on the operation button 68 is set to a reproduction mark. The CPU 20 thereafter returns its control to step SP19 so that it thereafter repeats the processing of the loop of the steps SP19-SP20-SP21-SP22-SP23-SP19 until an affirmative discrimination is obtained in any of the steps SP19 to SP23.

On the other hand, if the discrimination in step SP20 is in the affirmative, then the CPU 20 advances its control to step SP30 (FIG. 13), in which it detects the position of the slider 69 and converts the position of the slider 69 then with respect to the top (frame image) and the last (frame image) of the image-sound material provided by the right end and the left end of the range of movement of the slider 69 into a frame number of the corresponding image-sound material.

Then, the CPU 20 advances its control to step SP31, in which it reads out encoded data D2 for one frame of the thus obtained frame number from the video server 3, and then to step SP32, in which the CPU 20 controls a frame image based on the obtained encoded data D2 to be displayed in the image display section 64 of the corresponding material card 63. Thereafter, the CPU 20 returns its control to step SP19 so that it thereafter repeats the processing of the loop of the steps SP19-SP20-SP21-SP22-SP23-SP19 until an affirmative discrimination is obtained in any of the steps SP19 to SP23.

On the other hand, if the discrimination in step SP21 is in the affirmative, then the CPU 20 advances its control to step SP23 (FIG. 14), in which the CPU 20 forms, in the RAM 22 (FIG. 2), a management buffer for copying the encoded data D2 and the text data D3 of the corresponding image-sound material between the file list window 61 and the clip window 62 of the material selection screen 60.

Then, the CPU 20 advances its control to step SP34, in which it stores the encoded data D2 and the text data D3 of the dragged image-sound material into the management buffer, and then to step SP35, in which it discriminates whether or not the material card 63 of the image-sound material is dropped into the clip window 62.

If the discrimination in step SP35 is in the affirmative, then the CPU 20 advances its control to step SP36, in which it causes the clip card 76 (FIG. 7) to be displayed in the clip window 62 and causes a still picture and text information based on the encoded data D2 and the text data D3 stored in the management buffer to be displayed at predetermined positions in the clip card 76. Thereafter, the CPU 20 returns its control to step SP19. On the contrary, if the discrimination in step SP35 is in the negative, then the CPU 20 returns its control directly to step SP19. In either case, the processing of the loop of the steps SP19-SP20-SP21-SP22-SP23-SP19 is repeated again until an affirmative discrimination is obtained in any of the steps SP19 to SP23.

On the other hand, if the discrimination in step SP22 is in the affirmative, then the CPU 20 advances its control to step SP37 (FIG. 15), in which it selects, from among the image-sound materials whose material cards 63 are displayed in the file list window 61 then, one of those image-sound materials whose reproduction flags are on and reads out, from the video server 3, the encoded data D2 of a frame image of the image-sound material later by n frames than the frame image displayed on the image display section 64 of the material card 63 then.

Then, the CPU 20 advances its control to step SP38, in which it causes the frame image based on the thus obtained encoded data D2 to be displayed in the image display section 64 of the material cards 63, and then to step SP39, in which the position of the slider 69 of the material card 63 is moved to a position corresponding to the frame image displayed in the image display section 64 then so that the slider 69 may be displayed at the position.

Then, the CPU 20 advances its control to step SP40, in which it discriminates whether or not there remains an image-sound material whose material card 63 is displayed in the file list window 61 then, and returns its control to step SP37 if the discrimination is in the negative.

Thus, similar processing for all of the image-sound materials whose material cards 63 are displayed in the file list window 61 is completed soon, and the discrimination in step SP41 becomes affirmative. Consequently, the CPU 20 returns its control to step SP19 so that it thereafter repeats the processing of the loop of the steps SP19-SP20-SP21-SP22-SP23-SP19 until an affirmative discrimination is obtained in any of the steps SP19 to SP23.

On the other hand, if the discrimination in step SP23 is in the affirmative, then the CPU 20 advances its control to step SP42, in which the material retrieval and selection mode processing procedure RT1 is ended.

5. Operation and Advantages of the Embodiment

In the edit list production apparatus 1 having the construction described above, when it is in the material retrieval and selection mode, in a corresponding relationship to image-sound materials selected by retrieval processing, material cards 63 on which still pictures, titles and material lengths of the image-sound materials are displayed, are displayed in the file list window 61 of the material selection screen 60 of the display unit 31 of the client computer 5.

In this instance, an operation button 68 and a slider 69 are displayed on each of the material cards 63. Thus, for example, if the operation button 68 is clicked, then a motion picture of the image-sound material corresponding to the material card 63 of it is displayed in the image display section 64 or display of a motion picture is stopped (a still picture is displayed). On the other hand, if the slider 69 is operated, then a frame image corresponding to the position of the slider 69 then is displayed in the image display section 64.

Accordingly, with the edit list production apparatus 1, contents of each of the image-sound materials selected by retrieval can be confirmed in a short time, and a desired image-sound material can be selected readily and rapidly as much.

With the edit list production apparatus 1 having the construction described above, since it is constructed such that material cards 63 in each of which operation button 68 and slider 69 are displayed in a corresponding relationship to image-sound materials selected by retrieval, are displayed and, when an operation button 68 is operated, a motion picture of the corresponding image-sound material or display of a motion picture is stopped whereas, when a slider 69 is operated, a frame image corresponding to the position of the slider 69 then is displayed in the image display section 64, contents of each of the image-sound materials selected by retrieval can be confirmed in a short time. Thus, a desired image-sound material can be selected readily and rapidly. Consequently, an edit list production apparatus wherein the working efficiency in selection operation of an image-sound material can be augmented significantly, can be implemented.

6. Others

While, in the embodiment described above, the present invention is applied to an edit list production apparatus, the present invention is not limited to this, and the present invention can be applied widely to various image material selection apparatus which are generally constructed such that a desired image material can be selected from among a plurality of image materials.

Further, while, in the embodiment described above, each of image-sound materials selected by retrieval is displayed in the form of a card in the file list window 61 of the material selection screen 60, the present invention is not limited to this and can be applied to various displaying manners such as, for example, a list type display wherein image-sound materials are successively displayed in a vertical direction of the screen.

Further, while, in the embodiment described above, as identification information of each image-sound material selected by retrieval so as to be displayed in the file list window 61 of the material selection screen 60, a top frame image and text information of the title and the material length of the image-sound material are displayed, the present invention is not limited to them, and various information can be applied widely only if each image-sound material selected by retrieval can be identified with it. Thus, the identification information may only be a still picture or text information.

Further, while, in the embodiment described above, only one operation button 68 is provided in each material card 63, the present invention is not limited to this, and a plurality of operation buttons 68 may be provided for reproduction, stopping, fast feeding, rewinding, double speed reproduction, reverse reproduction and/or reverse double speed reproduction.

Furthermore, while, in the embodiment described above, an operation button 68 and a slider 69 are provided in each material card 63, the present invention is not limited to this, and either one of them may be provided in each material card 63.

Further, while, in the embodiment described above, the client computer 5 serving as display means which displays, for each image-sound material selected by retrieval, still picture or a motion picture, text information such as a title, an operation button 68 and a slider 69 as a material card 63 and displays, for each image-sound material whose operation button 68 is operated, a motion picture or a still picture is constructed in such a manner as shown in FIG. 2, the present invention is not limited to this and various other constructions can be applied.

Further, while, in the embodiment described above, a title and a material length are displayed as relating information of each image-sound material selected by retrieval, the present invention is not limited to this, and any other text information may be displayed.

While a preferred embodiment of the present invention has been described using specific terms, such description is for illustrative purposes only, and it is to be understood that changes and variations may be made without departing from the spirit or scope of the following claims.

What is claimed is:

1. An editing apparatus for editing a plurality of video data or a plurality of audio data, comprising:

a recording and reproduction apparatus for storing the plurality of video data or the plurality of audio data in an individually corresponding relationship as a plurality of material files and selectively accessing any of the plurality of material files to reproduce the video data or the audio data included in the accessed material file; and a computer including display means for displaying a graphical user interface to be used to edit the plurality of video data or the plurality of audio data and control means for controlling a reproduction operation of said recording and reproduction apparatus based on an editing operation in which the graphical user interface is used;

said display means displaying a plurality of material cards individually corresponding to the plurality of material files in order to allow contents of the video data or the audio data included in the material files to be accessed, each of the material cards including an image display section for displaying an image corresponding to the video data or the audio data included in the corresponding material file and a reproduction control section for controlling reproduction of the video data or the audio data related to the image displayed on the image display section;

said control means controlling said recording and reproduction apparatus in response to an editing operation in which the reproduction control section is used so as to display a video image corresponding to the editing operation in which the reproduction control section is used;

wherein the reproduction control section of each of the material cards includes a slider for designating a reproduction position of the video data or audio data displayed on the image display section, and wherein the graphical user interface includes a selection interface so that any of the material cards can be selected as a clip card for editing the video data or audio data stored in the material file corresponding to the selected material card.

2. An editing apparatus according to claim 1, wherein said computer includes retrieval means for retrieving the plurality of material files recorded in said recording and reproduction apparatus.

3. An editing apparatus according to claim 1, wherein the reproduction control section of each of the material cards includes a button representing a reproduction condition of the video data or the audio data displayed on the image display section.

4. An editing apparatus according to claim 1, wherein said control means makes a start end and a last end of a range of movement of the slider on the material card selected from among the plurality of material cards correspond to a start frame and an end frame of the video data or the, audio data corresponding to the selected material card to reproduce a frame corresponding to the position of the slider in the range of movement from said recording and reproduction apparatus.

5. An editing method for editing a plurality of video data or a plurality of audio data using an editing apparatus which includes a recording and reproduction apparatus for storing the plurality of video data or the plurality of audio data in an individually corresponding relationship as a plurality of material files and selectively accessing any of the plurality of material files to reproduce the video data or the audio data included in the accessed material file, and a computer for displaying a graphical user interface to be used to edit the plurality of video data or the plurality of audio data and controlling a reproduction operation of said recording and reproduction apparatus based on an editing operation in which the graphical user interface is used, comprising the steps of:

displaying a plurality of material cards individually corresponding to the plurality of material files in order to allow contents of the video data or the audio data included in the material files to be accessed, each of the material cards including an image display section for displaying an image corresponding to the video data or the audio data included in the corresponding material file and a reproduction control section for controlling reproduction of the video data or the audio data related to the image displayed on the image display section; and controlling said recording and reproduction apparatus in response to an editing operation in which the reproduction control section is used so as to display a video image corresponding to the editing operation in which the reproduction control section is used;

wherein the reproduction control section of each of the material cards includes a slider for designating a reproduction position of the video data or audio data displayed on the image display section, and wherein the graphical user interface includes a selection interface so that any of the material cards can be selected as a clip card for editing the video data or audio data stored in the material file corresponding to the selected material card.

6. An editing method according to claim 5, wherein the reproduction control section of each of the material cards includes a button representing a reproduction condition of the video data or the audio data displayed on the image display section.

7. An editing method according to claim 5, wherein said computer means makes a start end and a last end of a range of movement of the slider on the material card selected from among the plurality of material cards correspond to a start frame and an end frame of the video data or the audio data corresponding to the selected material card to reproduce a frame corresponding to the position of the slider in the range of movement from said recording and reproduction apparatus.

8. An image material selection apparatus for selecting any of a plurality of image materials, comprising:

display, means for displaying each piece of identification information of the plurality of image materials on a screen, displaying operation buttons in a corresponding relationship to different pieces of the identification information displaying, when any of the operation buttons is operated, a motion picture of the corresponding image material on said screen, displaying sliders in an individually corresponding relationship to the pieces of the identification information, and displaying, when any of the sliders is operated, an image of the corresponding image material corresponding to a position of the slider on said screen; and selection deans for selecting any of the pieces of the identification information for editing.

9. An image material selection apparatus according to claim 8, wherein each piece of the identification information includes a still picture and relating information of the corresponding image material.

10. An image material selection method for selecting any of a plurality of image materials, comprising:

a first step of displaying identification information of the plurality of image materials on a screen including displaying a plurality of operation buttons in a corresponding relationship to different pieces of the identification information respectively and displaying sliders in an individually corresponding relationship to the pieces of the identification information;

a second step of displaying, when any of the operation buttons is operated, a motion picture of the corresponding image material on said screen, and displaying, when any of the sliders is operated, an image of the corresponding image material corresponding to a position of the slider is displayed on said screen; and a third step of selecting any of the pieces of the identification information for editing.

11. An image material selection method according to claim 10, wherein, in the first step, as the identification information, still pictures and relating information of the image materials are displayed.

* * * * *